(12) United States Patent
Walker et al.

(10) Patent No.: US 6,594,696 B1
(45) Date of Patent: Jul. 15, 2003

(54) NETWORK MANAGEMENT APPARATUS AND METHOD EMPLOYING "OBJECT TIPS" FOR THE DISPLAY OF DETAILED DATA

(75) Inventors: Lee Anthony Walker, Watford (GB); Mark Douglas Cook, St Albans (GB); Christopher Robert Linzell, St Albans (GB); Simon Peter Valentine, Hemel Hempstead (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/499,877

(22) Filed: Feb. 8, 2000

(30) Foreign Application Priority Data

May 10, 1999 (GB) ............................................. 9910839

(51) Int. Cl.[7] .............................................. G06F 15/173
(52) U.S. Cl. ...................... 709/223; 370/254; 345/711; 345/744; 707/104.1
(58) Field of Search ................................ 345/734, 744, 345/853, 711; 709/223, 224; 370/254

(56) References Cited

U.S. PATENT DOCUMENTS

| 5,261,044 | A | * | 11/1993 | Dev et al. ..................... 345/855 |
| 5,546,521 | A | * | 8/1996 | Martinez ....................... 345/711 |
| 5,726,979 | A | * | 3/1998 | Henderson et al. ......... 370/254 |
| 5,754,176 | A | * | 5/1998 | Crawford ..................... 345/711 |
| 5,805,819 | A | | 9/1998 | Chin et al. ............. 395/200.54 |
| 6,058,103 | A | * | 5/2000 | Henderson et al. ......... 370/254 |
| 6,092,081 | A | * | 7/2000 | Alpert et al. ............ 707/104.1 |
| 6,219,050 | B1 | * | 4/2001 | Schaffer ..................... 345/853 |
| 6,272,537 | B1 | * | 8/2001 | Kekic et al. ................ 709/223 |
| 6,396,511 | B1 | * | 5/2002 | Karino ........................ 345/744 |

FOREIGN PATENT DOCUMENTS

WO    WO 97/37292    9/1997

* cited by examiner

*Primary Examiner*—David Wiley
*Assistant Examiner*—Michael Delgado
(74) *Attorney, Agent, or Firm*—McDonnell Boehnen Hulbert & Berghoff

(57) ABSTRACT

A network management apparatus is described which includes a port for connecting to a network for receiving management data from network devices on the network. The network management apparatus includes a processor for processing the received management data and for determining substantially a complete topology of the network and providing image data representative of the network topology. The apparatus further includes a display for receiving the image data and displaying a graphical representation of the network. The processor is adapted to process the received management data to obtain object data for each network object (i.e. device or link) on the network. The object data is provided to the display, for display in graphical form by means of an object tip or tool tip, when the user points to a predetermined part of the graphical representation of the corresponding network object on the display.

18 Claims, 6 Drawing Sheets

NETWORK MANAGEMENT APPARATUS AND METHOD EMPLOYING "OBJECT TIPS" FOR THE DISPLAY OF DETAILED DATA

BACKGROUND OF THE INVENTION

1. Field of the Invention

The present invention relates to an apparatus and method for the management of a network.

2. Description of the Related Art

The following description is concerned with a data communications network such as a local area network (LAN) but has more widespread applicability to other managed networks including wide area networks (WANs) and wireless communications systems.

Networks typically comprise a plurality of computer systems, peripherals and other electronic devices capable of communicating with each other by sending and receiving data packets in accordance with a predefined protocol. Each computer or other device on the network is connected by a port to the network media, which in the of case an Ethernet or LAN network may be coaxial or twisted pair cable or fibre optic cable. Each device on the network typically has hardware for media access control (MAC) with its own unique MAC address. Data packets are sent and received in accordance with the MAC protocol whereby the data packets identify the source MAC address (i.e. the MAC address of the device sending the data packet) and the destination MAC address (i.e. the MAC address of the device for which the data packet is destined) in the header of the data packet.

A network is generally configured with devices having a plurality of ports which can be used to interconnect a plurality of media links on the network. Such devices include hubs, routers and switches which pass data packets received at one port to one or more of its other ports, depending upon the type of device. Such devices can either be managed or unmanaged. Managed devices have processing capability including the capability of leaning the MAC addresses of the devices connected to their ports by monitoring the source address of data packets passing through the respective ports. Identified source addresses transmitted from a port of a managed network device, such as a router, hub or switch, are stored in a respective address table associated with the port. Managed devices additionally have the capability of communicating data, such as that stored in their port address tables, to other managed devices. This data is transmitted in accordance with a predetermined protocol in accordance with the network management system (for example the SNMP protocol). Unmanaged network devices do not have these capabilities.

It is becoming increasingly commonplace for an individual to be responsible for network management, and his or her computer system or workstation is typically designated the network management station. The network management station incorporates the necessary application hardware and software to retrieve data from the managed devices on the network in order to determine factors about the operation of the network. The data retrieved from the managed network devices is typically compiled and graphically displayed on the visual display unit of the network management station for the network manager or administrator to interpret.

In known network management systems, the manner in which the relevant data is retrieved from the managed devices, compiled and displayed has been problematic in several respects. Firstly, the data received from each of the managed devices is simply compiled and displayed as a list of data for the user to interpret. Secondly, the data does not provide information about unmanaged devices. Thirdly, information about a given network device, such as the type of device, location of the device on the network and operating speed of the device, may be contained in different sections of the compiled data. Consequently, conventional systems are cumbersome and difficult to use. Previous methods of improving the display of network management data has required users to invoke dialogs (separate windows of text) containing more information about the object or device on the network. The difficulty in using such dialogs is that they are slow, and require more user interaction to open and close them. These disadvantages are exacerbated if the user wishes to view the details of several devices either simultaneously or in turn. In addition, the use of extra windows and text to display detailed information about a device may utilise a large proportion of the screen of the visual display unit and thus obscure information about other devices on the network.

Accordingly, the present invention aims to provide a more convenient and user-friendly way of retrieving, compiling and displaying complete and understandable information about devices on the network and the network topology.

SUMMARY OF THE INVENTION

In accordance with a first aspect, the present invention provides a network management apparatus comprising:

a port for connecting to a network and for receiving management data from network devices on a network;

a processor for processing the received management data to determine substantially the complete topology of the network and provide image data representative thereof; and a display for receiving the image data and displaying a graphical representation of the network;

wherein the processor is configured to process the received management data to obtain object data for each network object, and to provide said object data for each network object to the display for display in graphical form by means of an object tip or tool tip when the user points to a predetermined part of the graphical representation of the corresponding network object on the display.

In accordance with a second aspect the present invention provides a method for operating a network management apparatus, the method comprising:

receiving management data from network devices on the network at a management port;

processing the management data to determine substantially the complete network topology and to obtain image data representative of the network topology;

displaying the image data on a display in the form of a graphical representation of the network; the method further including processing the received management data to obtain object data representing information about each network object on the network; and in response to a pointer pointing to a predetermined part of the graphical representation of a network object on the display, providing said object data to the display for display, in the form of an object tip or tool tip, of the object data, representing the corresponding network object, on the display.

In accordance with a third aspect, the present invention provides a computer program for performing the method of the second aspect of the present invention, embodied on a computer readable medium or embodied in a carrier wave.

The present invention, by utilising object tips (or tool tips) which may be activated by the user simply by placing the pointer at an appropriate position on the screen (e.g. by using a mouse) the network manager can more quickly view more detailed information about a given device or its link without positive interaction with the network management station to open and close dialogs. Furthermore, since the detailed information is normally hidden from the user, the information does not clutter the graphical display of information on the screen. Thus, the present invention is quicker and simpler to use and can provide detailed information which may be required by the network manager without obscuring the display screen.

BRIEF DESCRIPTION OF THE DRAWINGS

An embodiment of the present invention will now be described, by way of example, with reference to the accompanying drawings, in which.

DETAILED DESCRIPTION OF THE PREFERRED EMBODIMENTS

Figure 1:
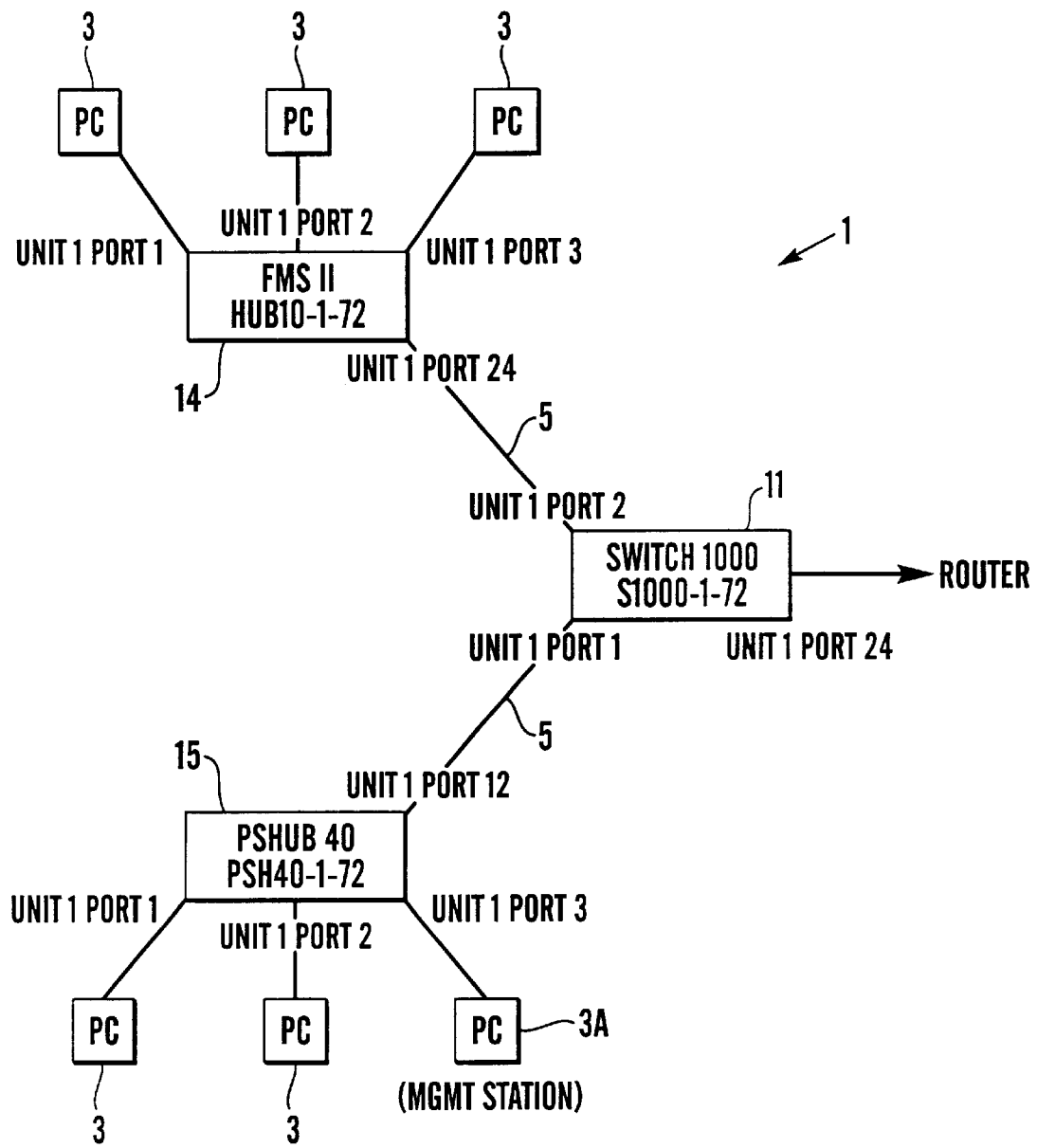
FIG. 1 is a block diagram of a typical network.
Figure 2:
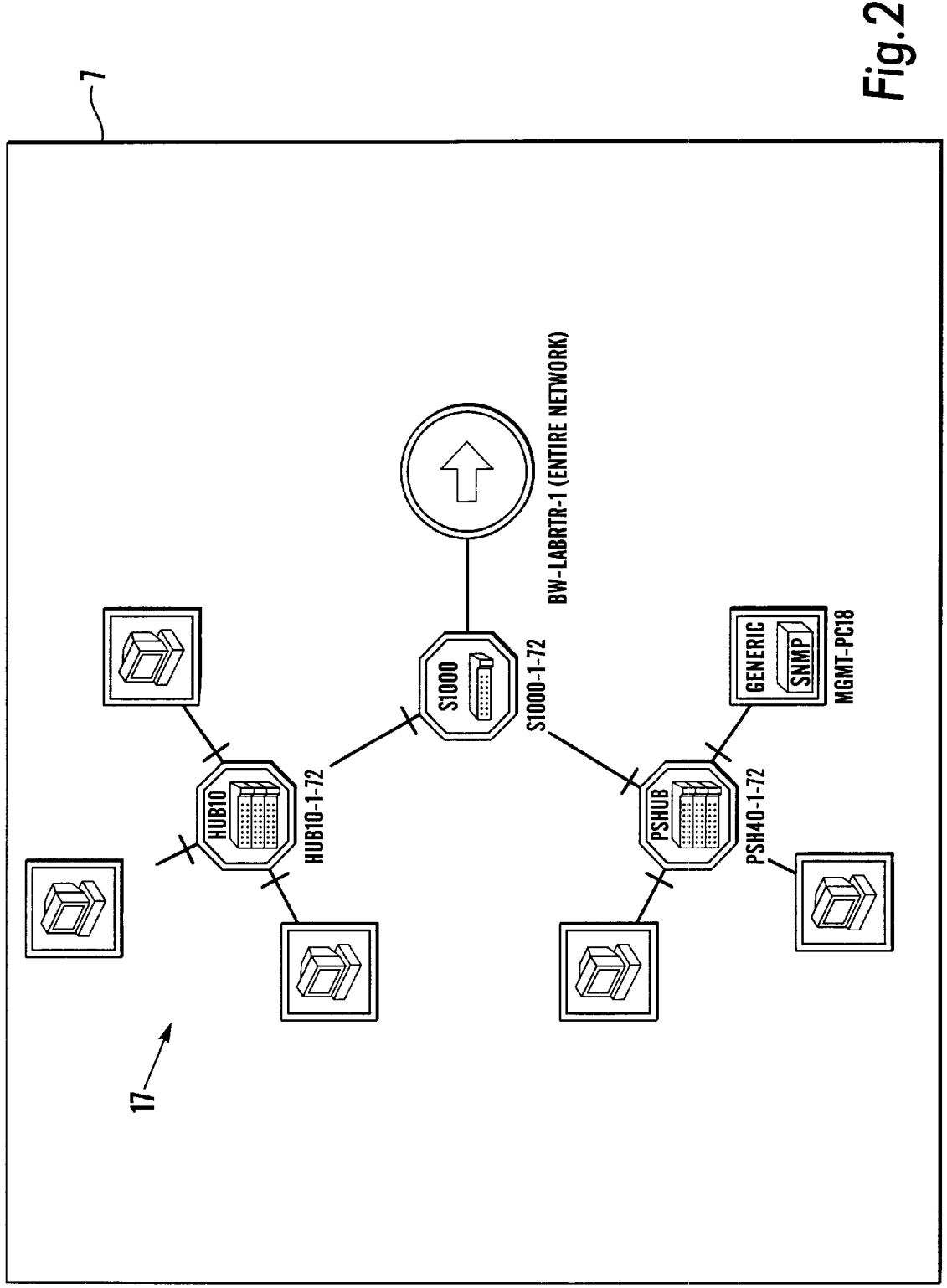
FIG. 2 is a graphical representation of the network of FIG. 1 shown on the screen of a network management station.

FIG. 1 shows a typical network 1 connecting a plurality of personal computers (PCs) 3 by means of media links 5 for communication of data therebetween. The network includes managed network devices including switch 11 having ports connected to inter alia two media links 5 and a router (not shown) and two hubs 14 and 15 respectively connected to one of the media links 5 and a plurality of PCs 3. One of the PCs 3A is designated the network management station and, in accordance with the present invention, includes a visual display screen 7 on which the network manager can view data about the network 1. In addition, the network management station includes a processor such as a CPU, a memory, and a disk drive and preferably also a modem for internet access, as well as user interfaces such as a keyboard and mouse. Data is obtained by the network management station 3A retrieving management data from the managed network devices 11, 14 and 15 by known methods and processing the data to determine the topology of the network and obtaining image data suitable for graphical representation of the network as shown in FIG. 2. For further information concerning the method of data retrieval, determination of the network topology to obtain image data and display of the image data by the network management system reference is made to our three copending UK patent applications Nos. 9910838.3, 9910840.9 and 9910843.3 all entitled "Supervising a Network" filed simultaneously herewith and hereby incorporated by reference.

Thus, as shown in FIG. 2, the network management station 3A displays a graphical representation 17 of the network topology, identifying each network device (PC, hub, switch, etc) by an appropriate icon which depicts an image of the device, and the network links which connect the network devices, by continuous lines connecting the relevant icons on the graphical representation 17 or map. The icons on the graphical map can be scaled, for example enlarged by conventional processing methods to provide a larger image of the relevant device which will enable the network manager to identify the icons which are otherwise too small to identify on the normal size network map.

The network management station 3A retrieves the following management data from each of the managed devices 11, 14 and 15 on the network 1. Firstly, the object type such as "router", "hub", "switch", "end-station", "PC", "printer", "workstation" etc. This information is provided in the object ID (Sys Object ID) as is well known in the art. In addition, the network management system retrieves additional data from address tables, for example, of the network device sufficient to enable it to determine the topology of the network and the type and speed of operation of the links connecting the devices.

Figure 3:
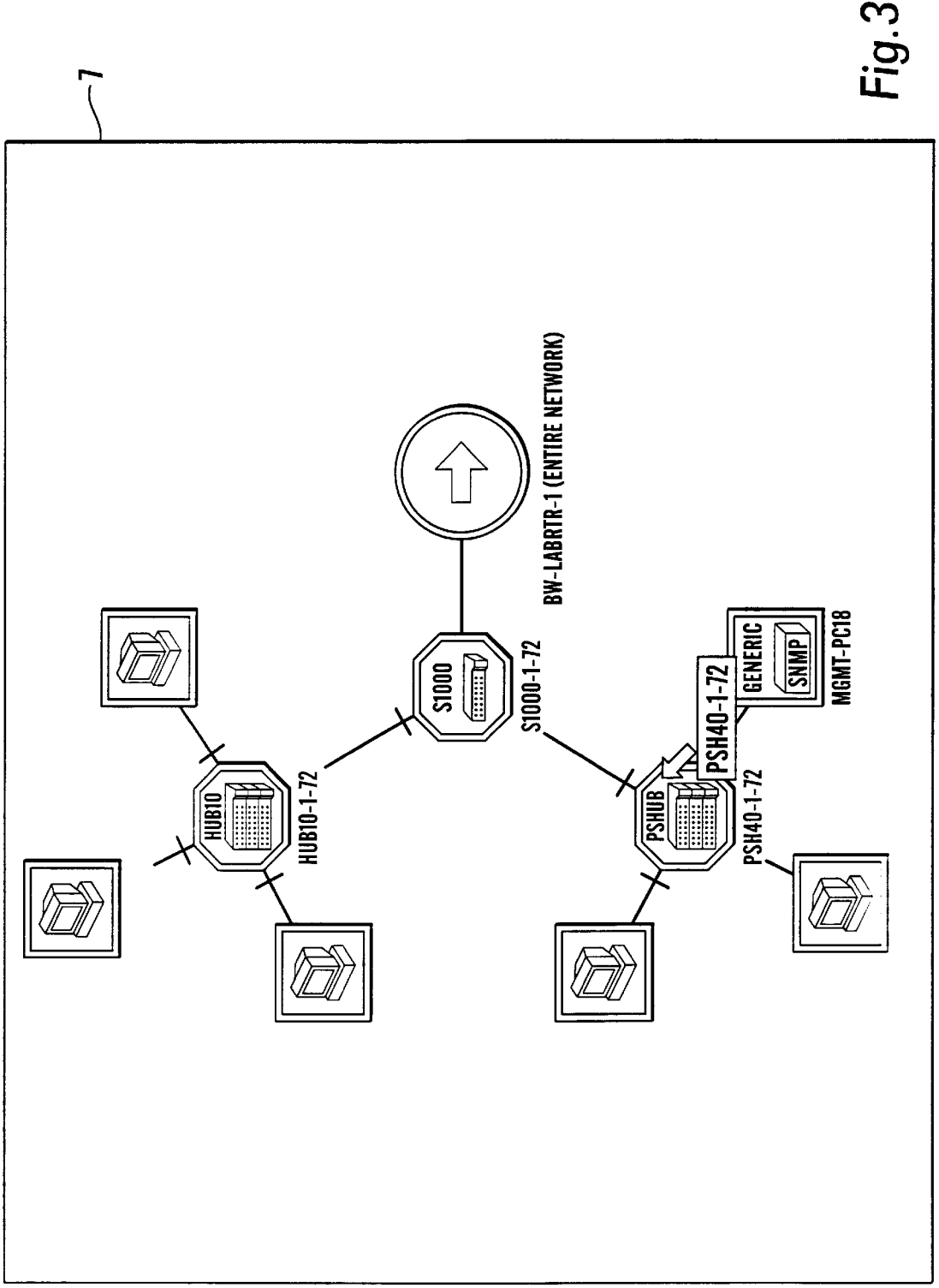
FIG. 3 is the graphical representation of the network of FIG. 2 with the pointer pointing to a network device and displaying an object tip for that device in accordance with the present invention.
Figure 4:
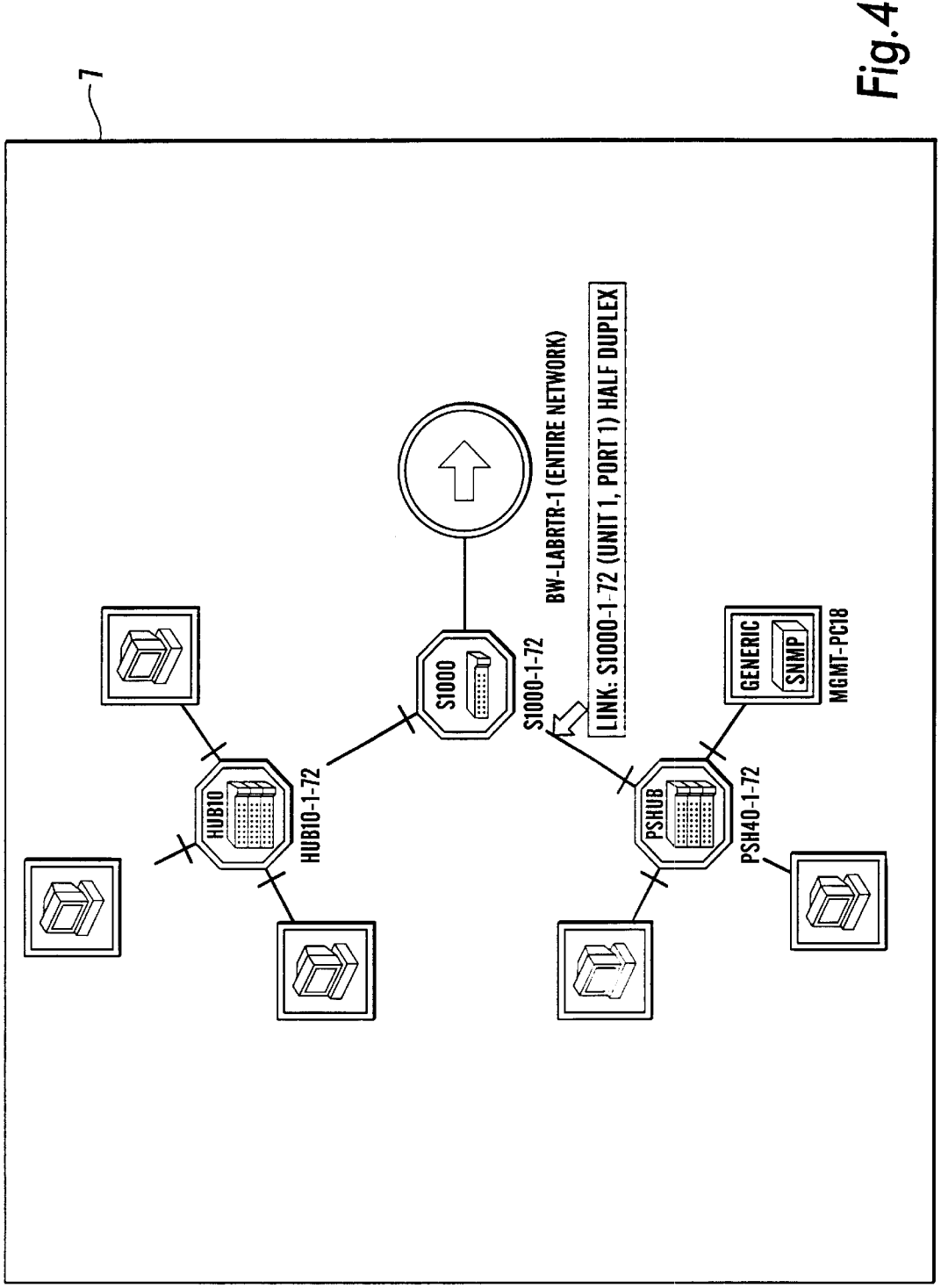
FIG. 4 is the graphical representation of the network of FIG. 2 with the pointer pointing to a first end of a network link and displaying a corresponding object tip for that end of the link in accordance with the present invention.
Figure 5:
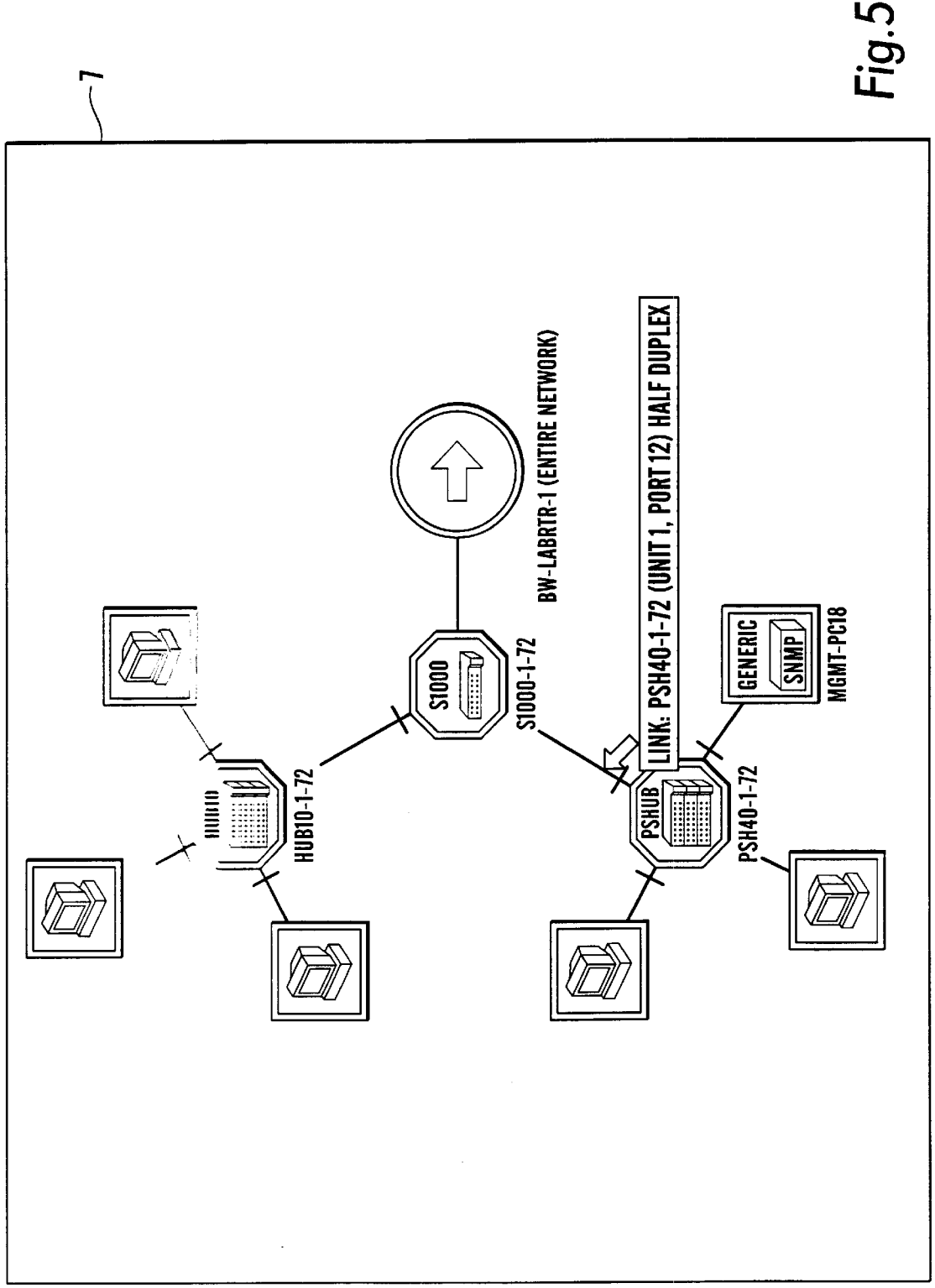
FIG. 5 is the graphical representation of the network similar to FIG. 4 with the pointer pointing to a second end of a network link and displaying a corresponding object tip for that end of the link in accordance with the present invention.

Referring now to FIGS. 3 to 5, the network management station 3A in accordance with the present invention provides for the use of object tips (or tool tips) in its application. Object tips can be used to display detailed information about a network object. For the avoidance of doubt, a network object is herein defined as any device connected on a network and any link connecting two such network devices.

The basic principle required to implement object tips is known in the art and reference is made, for example, to software applications provided by the SWING library (Sun Microsystems' GUI library for Java). Several other vendors' implementations are also available. This basic principle is to provide a "ToolTipManager" which can be associated with a specific graphical representation on screen. The ToolTipManager tracks the movement of a pointer (e.g. the mouse cursor) as it moves around the area of the screen that is displaying the graphical representation. In the present case the graphical representation is the map of the network.

Each time the mouse cursor stops for a preset period of time (e.g. 1 second) the ToolTipManager calls the 'application specific' code to obtain the text that should be displayed at the cursor's current coordinates on the screen (e.g. x,y position). Based on this x,y position, the application then needs to determine whether the cursor is over an object (e.g. icon for a network device or link) that requires an object tip, and subsequently what data that object tip should contain.

In the present embodiment, the application specific code would use the x,y coordinates of the mouse cursor to determine whether or not there is a graphical representation of a network device or link below the mouse cursor. If there is, then in accordance with the present invention it will return the appropriate object data, as discussed in more detail below, for display in the form of an object tip (usually text e.g. device="device name", or link="device name, unit/port information, link attributes", etc).

Note that for links, the text returned to the ToolTipManager is dependent on which end of the link the cursor is over, as explained below.

The processor of the network management station 3A processes the management data retrieved from the managed devices and compiles the data for each network object, which will be displayed in the object tip. Typically, for network devices, the object tip includes one or more of: the object type and name (which may include the user's name), and further details about the identity and performance of the object as desired. Thus, FIG. 3 shows the pointer is pointing to the graphical representation of hub 15 and the revealed object tip is "psh40-1-72" indicating the type of hub.

For links between two objects, in accordance with the present embodiment, the link is effectively divided into two equal parts. The information which is contained in the object data and will be shown in the object tip is dependent on at which end of the link the pointer is held. The network management station compiles data relating to the relevant end of the link, which may be any combination of the following: the object type e.g. "link", "connection", etc; the name of the network device to which the link is connected; the unit and port to which the link is connected on the relevant network device, and the state information about the link e.g. "duplex mode", "resilient link mode", "trunk link mode" etc.

Thus, as shown in FIG. 4, the pointer points to the link 5 adjacent to the icon for switch 11 and the revealed object tip is: "Link: S1000-1-72 (Unit 1, Port 1) Half Duplex". Similarly, in FIG. 5, the pointer points to the same link 5 at the other end adjacent to the icon for hub 15 and the revealed object tip is: "Link: psh40-1-72 (Unit 1, Port 12) Half Duplex".

As will be appreciated from the above, in accordance with a preferred embodiment, the present invention is implemented in the form of a software application which may be provided in the form of a computer program on a computer readable medium. Such computer readable medium may be a disk which can be loaded in the disk drive of network management station 3A or the computer system carrying the website of, for example, the supplier of network devices, which permits downloading of the program over the internet by a network management station. Thus the present invention may be embodied in the form of a carrier wave with the computer program carried thereon.

Figure 6:
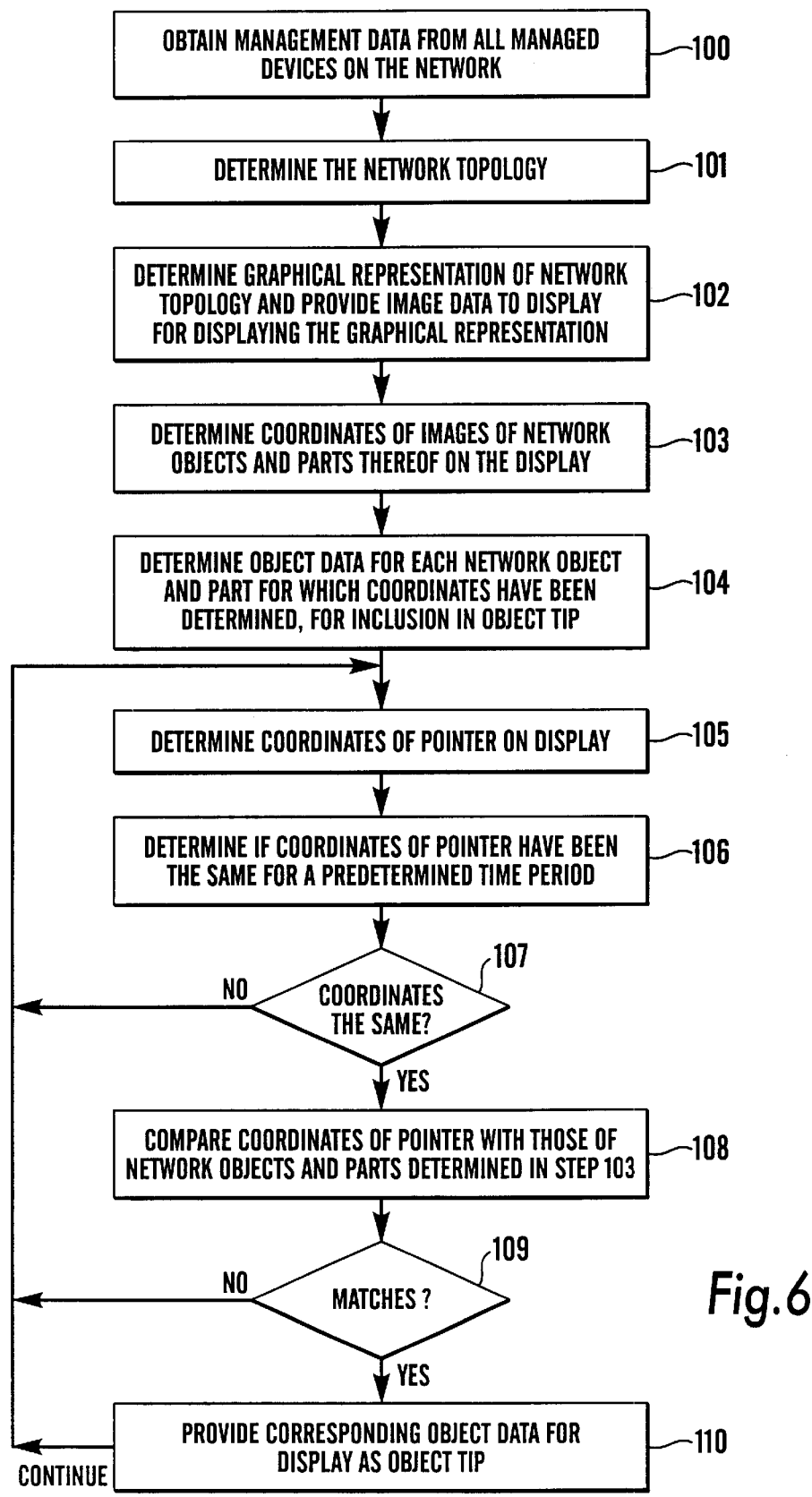
FIG. 6 is a block diagram of the program steps implemented in a computer program in accordance with the present invention.

FIG. 6 illustrates the program steps carried out by the computer program in accordance with a preferred embodiment of the present invention.

In step 100, the program obtains the management data from all managed network devices. This may be done by conventional methods of polling for example using the SNMP protocol. Alternatively, the network devices may be set up to automatically provide the data.

In step 101, the program determines the physical (and logical) topology of the network using the data obtained in step 100.

In step 102, the program determines a graphical representation of the topology determined in step 101 and provides image data to a display screen for displaying the graphical representation of the network or network map.

In step 103, the program determines the coordinates or range of coordinates of the images of network devices and parts of network links on the display screen, and stores these coordinates in memory.

In step 104, the program determines object data, for each network object or part of network link, from the management data obtained in step 100, for inclusion in a corresponding object tip.

In step 105, the Tool Tip Manager part of the program is implemented and the program periodically determines the coordinates of a pointer (e.g. mouse cursor) on the display.

In step 106, the program determines if the coordinates determined in step 105 have remained the same for a predetermined time period. At step 107, if the Tool Tip Manager finds in step 106 that the coordinates have been the same for the predetermined time period, it invokes the "application specific" code at step 108 in accordance with the present embodiment; otherwise the program returns to step 105.

In step 108 the program compares the coordinates of the pointer determined in step 105 with the coordinates of the images of network devices and parts of network links determined in step 103 stored in memory.

In step 109, if the comparison in step 108 finds a match, the program continues with step 110 by providing the object data to the display for display in the form of an object tip (or tool tip). If in step 109 there is no match, the program continues at step 105.

After step 110, the program returns to step 105 and the object tip remains displayed until the coordinates of the pointer change.

It will be appreciated that not all of program steps 100 to 108 are essential to the present invention. For instance, steps 100 to 102 may be provided by another program from a conventional software application. Similarly, steps 105 and 106 can be provided from another program, as explained above.

As will be appreciated from the above, the network management system in accordance with the described embodiment of the present invention has many advantages over known systems. In particular, the present invention enables access to additional information about network devices and links quickly and easily and makes better use of the available display area on the network manager's visual display unit.

As the skilled person will appreciate, many modifications may be made to the described embodiments. For example, the pointer could be associated with something other than a mouse, such as a tracker pad or plotter pen. It is intended to include all such modifications and equivalents which fall within the spirit and scope of the present invention.

What is claimed is:

1. A network management apparatus comprising:
    a port for connecting to a network and for receiving management data from network devices on a network;
    a processor for processing the received management data to determine substantially a complete topology of the network and provide image data representative thereof;
    a display for receiving the image data and displaying a graphical representation of the network;
    wherein the processor is configured to process the received management data to obtain object data for each network object, and to provide said object data for each network object to the display for display in graphical form by means of an object tip or tool tip when the user points to a predetermined part of the graphical representation of the corresponding network object on the display; and
    wherein the processor is further adapted to manipulate the received management data to obtain link data for each of the network links, and to provide the link data for each network link to the display for display in graphical form by means of an object tip or tool tip when the user points to a predetermined portion of the graphical representation of the corresponding network link on the display.

2. A network management apparatus as claimed in claim 1, wherein two or more sets of link data are determined for each network link connecting two or more network devices, each set of link data containing information relating to the connection with a respective network device, whereby the relevant set of link data is displayed in the form of an object tip or tool tip when the user points to the portion of the graphical representation of the link adjacent to the graphical representation of the relevant network device on the display.

3. A network management apparatus as claimed in claim 1, wherein the or each set of link data determined for display by means of an object tip or tool tip includes one or more of the following types of information: the link type, the name of the network device to which the link is connected, the unit and/or port of the network device to which the link is connected, and state information, such as operating mode, of the link.

4. A network management apparatus as claimed in claim 2, wherein the or each set of link data determined for display by means of an object tip or tool tip includes one or more of the following types of information: the link type, the name of the network device to which the link is connected, the unit and/or port of the network device to which the link is connected, and state information, such as operating mode, of the link.

5. A network management apparatus comprising:
   a port for connecting to a network and for receiving management data from network devices on a network;
   a processor for processing the received management data to determine substantially a complete topology of the network and provide image data representative thereof; and
   a display for receiving the image data and displaying a graphical representation of the network;
   wherein the processor is configured to process the received management data to obtain object data for each network object, and to provide said object data for each network object to the display for display in graphical form by means of an object tip or tool tip when the user points to a predetermined part of the graphical representation of the corresponding network object on the display; and
   wherein the object data comprises device data for each network device on the network; and
   wherein the processor is further adapted to manipulate the received management data to obtain link data for each of the network links, and to provide the link data for each network link to the display for display in graphical form by means of an object tip or tool tip when the user points to a predetermined portion of the graphical representation of the corresponding network link on the display.

6. A network management apparatus comprising:
   a port for connecting to a network and for receiving management data from network devices on a network;
   a processor for processing the received management data to determine substantially a complete topology of the network and provide image data representative thereof; and
   a display for receiving the image data and displaying a graphical representation of the network;
   wherein the processor is configured to process the received management data to obtain object data for each network object, and to provide said object data for each network object to the display for display in graphical form by means of an object tip or tool tip when the user points to a predetermined part of the graphical representation of the corresponding network object on the display;
   wherein the object data comprises device data for each network device on the network;
   wherein the device data obtained for each network device for display by means of an object tip or tool tip includes one or more of the following types of information: the device type, the device name, and the user's name; and
   wherein the processor is further adapted to manipulate the received management data to obtain link data for each of the network links, and to provide the link data for each network link to the display for display in graphical form by means of an object tip or tool tip when the user points to a predetermined portion of the graphical representation of the corresponding network link on the display.

7. A method for operating a network management apparatus, the method comprising:
   receiving management data from the network devices at a management port;
   processing the management data to determine substantially a complete network topology and to obtain image data representative of the network topology; and
   displaying the image data on a display in the form of a graphical representation of the network; the method further including:
   processing the received management data to obtain object data representing information about each network object on the network;
   in response to a pointer pointing to a predetermined part of the graphical representation of a network object on the display, providing the object data to the display for display, in the form of an object tip or tool tip, the object data representing the corresponding network object, on the display;
   processing the received management data to obtain link data representing information about each network link on the network; and
   in response to a pointer pointing to a portion of the graphical representation of a link on the display, providing the link data to the display for displaying, in the form of an object tip or tool tip, the link data representing the corresponding network link, on the display.

8. A method as claimed in claim 7, wherein two or more sets of link data are determined for each network link connecting two or more network devices, each set of link data relating to the connection with a respective network device, whereby the relevant set of link data is provided for display in the form of an object tip or tool tip when the user points to the portion of the graphical representation of the link adjacent to the graphical representation of the relevant network device on the display.

9. A method as claimed in claim 7, wherein the or each set of link data determined for display by means of an object tip or tool tip includes one or more of the following types of information: the link type, the name of the network device to which the link is connected, the unit and/or port of the network device to which the link is connected, state information, such as operating mode, of the link.

10. A method as claimed in claim 8, wherein the or each set of link data determined for display by means of an object tip or tool tip includes one or more of the following types of information: the link type, the name of the network device to which the link is connected, the unit and/or port of the network device to which the link is connected, state information, such as operating mode, of the link.

11. A method for operating a network management apparatus, the method comprising:
   receiving management data from the network devices at a management port;
   processing the management data to determine substantially a complete network topology and to obtain image data representative of the network topology; and
   displaying the image data on a display in the form of a graphical representation of the network; the method further including:
      processing the received management data to obtain object data representing information about each network object on the network;
      in response to a pointer pointing to a predetermined part of the graphical representation of a network object on the display, providing the object data to the display for display, in the form of an object tip or tool tip, the object data representing the corresponding network object, on the display;
      wherein the object data comprises device data for each network device on the network;
      processing the received management data to obtain link data representing information about each network link on the network; and
      in response to a pointer pointing to a portion of the graphical representation of a link on the display, providing the link data to the display for displaying, in the form of an object tip or tool tip, the link data representing the corresponding network link, on the display.

12. A method as claimed in claim 11, wherein two or more sets of link data are determined for each network link connecting two or more network devices, each set of link data relating to the connection with a respective network device, whereby the relevant set of link data is provided for display in the form of an object tip or tool tip when the user points to the portion of the graphical representation of the link adjacent to the graphical representation of the relevant network device on the display.

13. A method for operating a network management apparatus, the method comprising:
   receiving management data from the network devices at a management port;
   processing the management data to determine substantially a complete network topology and to obtain image data representative of the network topology; and
   displaying the image data on a display in the form of a graphical representation of the network; the method further including:
      processing the received management data to obtain object data representing information about each network object on the network;
      in response to a pointer pointing to a predetenmined part of the graphical representation of a network object on the display, providing the object data to the display for display, in the form of an object tip or tool tip, the object data representing the corresponding network object, on the display;
      wherein the object data comprises device data for each network device on the network;
      wherein the device data obtained for each network device for display by means of an object tip or tool tip includes one or more of the following types of information: the device type, the device name, and the user's name;
      processing the received management data to obtain link data representing information about each network link on the network; and
      in response to a pointer pointing to a portion of the graphical representation of a link on the display, providing the link data to the display for displaying, in the form of an object tip or tool tip, the link data representing the corresponding network link, on the display.

14. A method as claimed in claim 13, wherein two or more sets of link data are determined for each network link connecting two or more network devices, each set of link data relating to the connection with a respective network device, whereby the relevant set of link data is provided for display in the form of an object tip or tool tip when the user points to the portion of the graphical representation of the link adjacent to the graphical representation of the relevant network device on the display.

15. A network management apparatus comprising:
   a processor for processing management data received from network devices on a network to determine a topology of the network and to provide image data representative thereof; and
   a display for receiving the image data and displaying a graphical representation of the network;
   wherein the processor is configured to process the management data to obtain link data for each network link, and to provide the link data for each network link to the display for display in graphical form by means of an object tip or tool tip when the user points to a predetermined part of the graphical representation of the corresponding network link on the display.

16. A method for operating a network management apparatus, the method comprising:
   receiving management data from network devices;
   processing the management data to determine a network topology and to obtain image data representative of the network topology; and
   displaying the image data on a display in the form of a graphical representation of the network; the method further including:
   processing the received management data to obtain link data representing information about each network link on the network; and
   in response to a pointer pointing to a predetermined part of the graphical representation of a network link on the display, providing the link data to the display for display, in the form of an object tip or tool tip, the object data representing the corresponding network link, on the display.

17. A computer program on a computer readable medium, the program comprising:
   program means for receiving management data from the network devices;
   program means for processing the management data to determine a network topology and to obtain image data representative of the network topology; and
   program means for displaying the image data on a display in the form of a graphical representation of the network;
   program means for processing the received management data to obtain link data representing information about each network link on the network; and program means for providing, in response to a pointer pointing to a predetermined part of the graphical representation of a network link on the display, the link data to the display for display, in the form of an object tip or tool tip, the link data representing the corresponding network link, on the display.

18. A computer program embodied in a carrier wave for use in operating a network management apparatus, the program comprising:

program means for receiving management data from the network devices;

program means for processing the management data to determine a network topology and to obtain image data representative of the network topology; and program means for displaying the image data on a display in the form of a graphical representation of the network;

program means for processing the received management data to obtain link data representing information about each network link on the network; and program means for providing, in response to a pointer pointing to a predetermined part of the graphical representation of a network link on the display, the link data to the display for display, in the form of an object tip or tool tip, the link data representing the corresponding network link, on the display.

* * * * *